United States Patent [19]

Yamashita

[11] 4,106,283
[45] Aug. 15, 1978

[54] COMBINATION PORTABLE ELECTRONIC TIMEPIECE AND TELEVISION

[75] Inventor: Shiro Yamashita, Tokyo, Japan

[73] Assignee: Kabushiki Kaisha Daini Seikosha, Japan

[21] Appl. No.: 681,905

[22] Filed: Apr. 30, 1976

[30] Foreign Application Priority Data

May 1, 1975 [JP] Japan ................................ 50-52842

[51] Int. Cl.² ....................... G04C 3/00; G04C 17/00; G04C 23/00
[52] U.S. Cl. ................................ 58/152 R; 58/23 R; 58/50 R
[58] Field of Search ............... 58/23 R, 23 AC, 50 R, 58/127 R, 152 R, 153, 24 R, 25, 26 R, 35 W; 340/324 AD

[56] References Cited

U.S. PATENT DOCUMENTS

| | | | |
|---|---|---|---|
| 3,508,391 | 4/1970 | Lee | 58/23 R |
| 3,811,265 | 5/1974 | Cater | 58/24 R |
| 3,898,644 | 8/1975 | Baxter | 340/324 AD |
| 3,948,035 | 4/1976 | Kusumoto | 58/23 R |
| 4,014,166 | 3/1977 | Cateora et al. | 58/26 R |
| 4,020,628 | 5/1977 | Vittoz | 58/26 R X |

FOREIGN PATENT DOCUMENTS 2,421,439 11/1975 Fed. Rep. of Germany ........ 58/152 R Primary Examiner—Stanley J. Witkowski
Attorney, Agent, or Firm—Robert E. Burns; Emmanuel J. Lobato; Bruce L. Adams

[57] ABSTRACT

A portable electronic timepiece includes an electronic time-keeping device for developing electric time signals suitable for use as a time standard. The timepiece is equipped with a television receiver for receiving telecast TV signals and develops therefrom electric video signals representative of the video information contained in the telecast signals. Both the time signals and the video signals are applied through drive circuitry to a matrix indicator comprised of a plurality of longitudinal electrodes and a plurality of row electrodes. A switching circuit selectively applies the time or video signals to the matrix indicator for effecting display of either a time image or a video image.

5 Claims, 4 Drawing Figures

COMBINATION PORTABLE ELECTRONIC TIMEPIECE AND TELEVISION

BACKGROUND

This invention relates to a portable electronic timepiece and, more particularly, to a portable electronic timepiece such as a wrist watch or the like, which enables the portable electronic timepiece to selectively indicate either an image derived from a television signal or the time.

There are many instances wherein time information is contained in the video information telecast on television (TV). The object of the present invention is to provide a portable electronic timepiece operable to indicate or display the video information, and particularly to display the information in a matrix indicator to give an accurate indication of the time.

Figure 1:
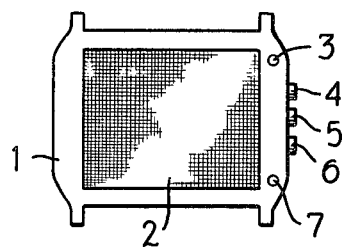
FIG. 1 is a plan view showing an embodiment of a portable electronic timepiece according to the present invention.

Referring now to the embodiment of the present invention accompanying to the drawings in which:

FIG. 1 shows an embodiment of the portable electronic timepiece according to the present invention comprising a watch case 1 equipped with a glass which enables viewing of the received TV picture as well as the matrix indicator which indicates the time determined by a time keeping device. An indication selecting switch button 3 is provided to select either the TV indication or the time indication; a time correcting switch button 4; a time adjusting control button 5; and a switch button for received frequency selection 6 are respectively provided on the case 1. Further, when a non-spontaneous illuminant device (i.e., a liquid crystal, PLZT, or the like) is employed as an indicator, a switch button 7 is provided which lights a lamp or an illuminant diode so that a TV image and the time indicated can be seen in the dark.

Figure 2:
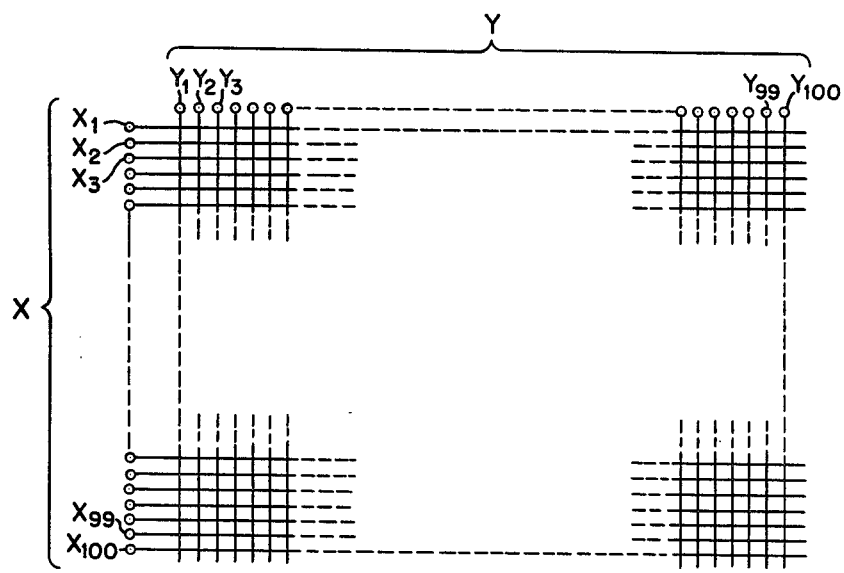
FIG. 2 is a schematic illustration showing the composition of a matrix indicator employed in the portable electronic timepiece shown in FIG. 1.

FIG. 2 shows an embodiment of the matrix indicator employed in the portable electronic timepiece according to the present invention, which is composed of a longitudinal electrode pattern X and a row electrode pattern Y, contrived by thin film technique, putting a liquid crystal portion (not shown in figure) therebetween. According to the present embodiment, the longitudinal electrode pattern X and the row electrode pattern Y are respectively composed of a hundred electrodes $X_1$-$X_{100}$ and $Y_1$-$Y_{100}$. The TV picture is in the longitudinal-lateral ratio of 3:4, therefore each of the intervals of the electrodes $X_1$-$X_{100}$ as opposed to each of the intervals of the electrodes $Y_1$-$Y_{100}$ are settled ¾. To give an example of the performance of the matrix indicator, when an electric field is applied across the electrodes $X_2$ and $Y_2$, the electron orientation of the liquid crystal in the space between the electrode $X_2$ and the electrode $Y_2$ differs from that at which no electric field is applied to thereby activate or distinguish the liquid crystal material in the area between the excited electrodes. Thus the matrix indicator indicates an image or picture, on the one hand, or a letter such as digit or the like on the other hand, by application of voltage to the electrodes $X_1$-$X_{100}$ and the electrodes $Y_1$-$Y_{100}$ selectively.

Figure 3:
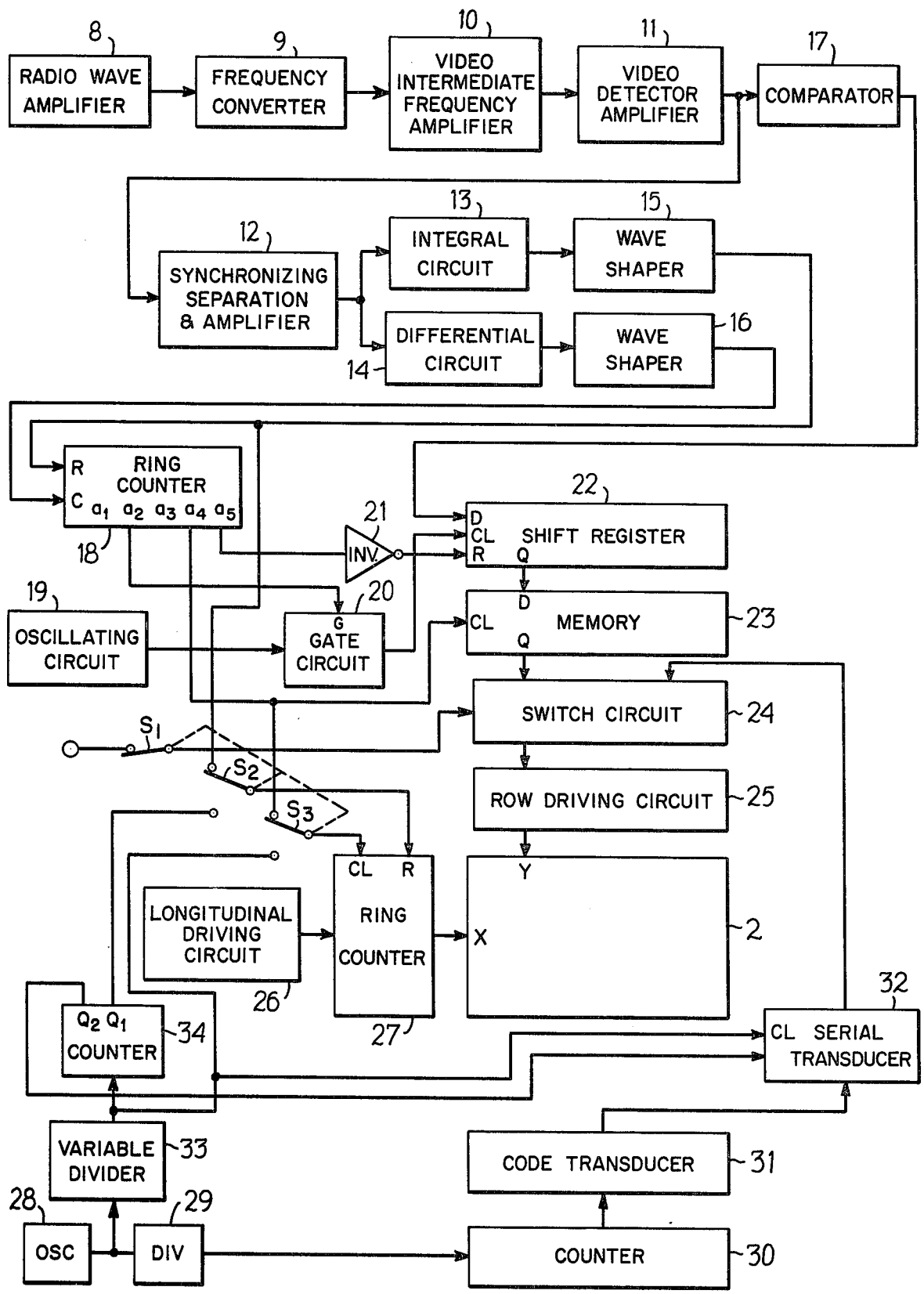
FIG. 3 is a flow diagram showing an embodiment of the portable electronic timepiece circuit according to the present invention.

FIG. 3 shows an embodiment of a circuit portion of the portable electronic timepiece according to the present invention and numerals 8–17 designate circuits of well-known construction and which comprise a receiver to receive the TV video signal. A radio wave amplifier 8 is connected to a frequency converter 9 which receives the video intermediate and mixes signal the signal amplified in the radio wave amplifier 8 with the signal generated by the local oscillation circuit (not shown in figure). A video intermediate frequency amplifier 10 amplifies the video intermediate frequency, a video detector and amplifier 11 detects and amplifies the signal put out from the video intermediate frequency amplifier 10, and a synchronizing separator and amplifier 12 separates and amplifies a vertical synchronized signal and a horizontal synchronized signal out of the video signal from the video detector and amplifier 11. An integral circuit 13 integrates the output signal from the synchronizing separator and amplifier 12, a differential circuit 14 differentiates the output signal, a wave shaper 15 obtains a vertical synchronized signal pulse (hereinafter described as a vertical pulse) by shaping the wave-shape of the output of the integral circuit 13, and a wave-shaper 16 obtains a horizontal synchronized signal pulse (hereinafter described as a horizontal pulse) by shaping the wave-shape of the output of the differential circuit 14. A comparator 17 compares the video signal level output from the video detector and amplifier 11 with a predetermined standard level and divides the video signal roughly into white level and black level components. The performance of the receiver illustrated so far may easily be understood by the performance of the known TV receiver, but explanations will follow so that this invention may be more readily understood.

To give an example of the TV transmitting signal, the 525 scanning lines and 30 Hz frame frequency (60 Hz field frequency by interlaced scanning) are the standard of Japan and other countries, wherein a horizontal synchronized signal is put out from the wave shaper 16 having a period of 63.5 μS and a vertical synchronized signal is put out from the wave-shaper 15 having a period of 16.66 mS. While the video signal is put in the period comparator 17 of the effective time of 53.3μS against a scanning line when the horizontal fly-back time is 16%. Since the video signal is in negative modulation, the black level thereof which looks black is put in the comparator 17 by wider amplitude than the white level which looks white. The comparator 17 selects the time indicating signal which looks white in the TV picture from the other signal information according to the video signal for, example, and compares the video signal level with the comparison standard voltage slightly higher than the white level because the time indicating signal is indicated so as to be classified with the other signal with the aid of the matrix indicator, and puts out the signal with logic "0" against the black level and with the logic "1" against the white level.

Numeral 18 designates a 5-ring counter whose input terminal C receives the horizontal pulse produced from the wave-shaper 16 and whose reset terminal R receives the vertical pulse produced from the wave-shaper 15.

The ring counter 18 is reset by receiving the vertical pulse at the reset terminal thereof whereby each of the output terminals $a_1$–$a_5$ changes to the logic "0" and the ring counter 18 repeats the same operation again.

Numeral 19 designates an oscillating circuit which generates a pulse at least in accordance with the number (according to this embodiment, 100) of electrodes in the row electrode pattern Y of the matrix indicator 2 during the effective scanning period of 53.5 μS. Namely the oscillating frequency of the oscillating circuit 19 in this case is about 1.87 MHz. The output of the oscillating circuit 19 is applied to the input of a gate circuit 20 and an output signal from the output terminal $a_2$ of the ring counter 18 is fed to the gate control terminal G so that the gate circuit opens the gate only when the gate control terminal G is logic "1," and allows the output of the oscillating circuit 19 to pass through the clock terminal CL of 120-shift register. The period during which the logic "1" signal is put out from the ring counter $a_2$ is about 63.5 μS and corresponds to the horizontal pulse period, meanwhile about 120-clock pulses are put in the oscillating circuit 19 being restricted by the gate circuit 20. Accordingly, shift register 22 has a 120 capacity. The video signal put out from the comparator 17 is put in a data input terminal D of the shift register 22 and the video signal is set in the shift register 22 in turn after the sampling. The video signal set in the shift register 22 corresponds to one scanning line, which is set in a hundred of registers, while a signal which is set in the rest of the registers is a fly-back signal which does not directly relate to the video. The signal which is set in the shift register 22 is cleared because the output signal from the output terminal $a_5$ of the ring counter 18 is put in the reset terminal R which is inverted by an inverter 21. Namely, video signals contained in one scanning line out of five scanning lines is set in the shift register 22 in turn. The video signal being set in a hundred of registers of the shift register 22 is put in a data input terminal D of memory 23 of a hundred bit from an output terminal Q. An output signal from an output terminal $a_4$ of the above mentioned 5-ring counter 18 is put in a clock terminal CL of the memory 23 as a clock pulse, and the memory 23 memorizes the video signal set in the shift register 22 which is put in the data input terminal D while the clock pulse turns from logic "1" into logic "0," as well as the memory 23 keeps the content of the memory which put out from the output terminal Q. The video signal memorized in the memory 23 is put in a row driving circuit 25 which drives the row electrode pattern Y of the matrix indicator by way of a switch circuit 24. The row driving circuit 25 generates a voltage determined according to the output of each of the bits which compose the memory 23, and supplys the voltage for each of electrodes $Y_1$, $Y_3$, $Y_5$, ... $Y_{99}$ and $Y_2$, $Y_4$, $Y_6$ ... $Y_{100}$.

Numeral $S_1$–$S_3$ are switches which are cut-off controlled by the indication selecting switch button 3 shown in FIG. 1. According to the figure, they represent the cut-off condition which indicates the TV signal.

Numeral 26 designates a longitudinal driving circuit which generates a predetermined voltage to drive the longitudinal electrode X pattern of the matrix indicator 2 which is fed to a ring counter 27. The ring counter 27 feeds an output signal from the output terminal $a_4$ of the 5-ring counter 18 as a clock pulse in the clock terminal CL by way of a switch $S_3$. The ring counter 27 is composed of a 50-first counter and a 50-second counter which repeats the following operation: Firstly the first counter counts the clock pulses applied to the clock terminal CL, and when the reset signal is put in the reset terminal R, the content of the first counter is reset. Nextly the second counter counts the clock pulses, and when the reset signal is applied thereto, the content of the second counter is reset and the first counter counts the clock pulses. The output of the first counter of the ring counter 27 is applied to each of the electrodes pattern in odd numbers $X_1$, $X_3$, ... $X_{99}$ of the longitudinal electrode X of the matrix indicator, while the output of the second counter is applied to each of the electrodes in even numbers $X_2$, $X_4$, ... $X_{100}$. The output voltage from the ring counter 27 corresponds to the voltage generated from the longitudinal driving circuit 26. In the event that the TV signal is to be indicated, the vertical pulse from the wave-shaper 15 is fed to the reset terminal R of the switch $S_2$.

Thus the circuit designated as numerals 18–27 are the TV signal indicating circuits.

Turning now to the time indicating circuit of the time keeping device an oscillating circuit 28 in the form of a quartz oscillator or the like generates an output whose oscillation frequency is divided into the time counting reference pulse of 1Hz by means of a frequency divider 29 which consists of frequency dividing steps which performs ½ frequency division of 15 steps. The reference pulse put out from the frequency divider 29 is counted by a counter 30 equipped with a 60-counter which corresponds to a second, a 60-counter corresponds to minutes and a 12-counter which corresponds to an hour. The counting value of the counter 30 is transduced into a code fit to indicate by the matrix indicator by means of a code transducing circuit 31.

Numeral 33 is a variable divider which divides the output signal from the oscillating circuit 28 into a signal of 3 KHz, and the output of the variable divider 33 is put in the clock terminal of the ring counter 27 by way of the switch $S_3$ (in case it is transduced to the opposite side), and the output thereof is fed to the clock terminal CL of a serial transducer 32 which transduces the output of the code transducer 31 into a serial signal. The serial transducer 32 transduces the output of the code transducer 31 into the serial signal synchronized with the clock put in the clock terminal CL. There are a hundred outputs from the serial transducer 32 which correspond to the row electrode pattern of matrix indicator 2, and each of the serial signals therefrom are applied to the row driving circuit 25 by way of the switching circuit 24 when the switch $S_1$ is switched to the opposite condition of that shown in the figure. Numeral 34 is a counter equipped with a terminal $Q_1$ which generates an output pulse whenever the output pulse from the variable divider 33 counts 50, and a terminal $Q_2$ which generates an output pulse whenever the output pulse from the variable divider counts 100, wherein the output pulse from the terminal $Q_1$ is fed to the reset terminal R of the ring counter 27 when the switch $S_2$ is switched to the opposite condition of that shown in the figure, and the output from the terminal $Q_2$ is fed to a control terminal of the serial transducer 32. Namely, the serial transducer 32 begins the output seriation of the code transducer by input pulses applied to its control terminal, and synchronization of the serial driving of the longitudinal electrodes $X_1$, $X_3$, ... $X_{99}$, $X_2$, $X_4$, ... $X_{100}$ and the serial signals which correspond thereto are actuated.

The performance of the portable electronic timepiece in accordance with the foregoing constitution will now be described.

Initially, the performance of the portable electronic timepiece in case the switch $S_1$, $S_2$, $S_3$ are switched as shown in the figure and the TV signals are indicated on the matrix indicator 2, is as follows.

Figure 4:
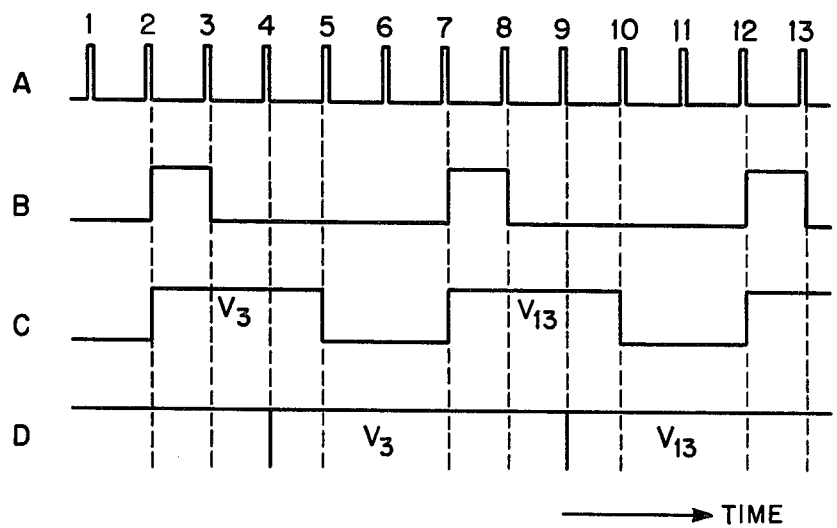
FIG. 4 is a time chart to explain the performance of the circuit shown in FIG. 3.

As described so far, the period of the vertical synchronizing signal included in a composite video signal of the standard TV signal which performs the fly-back scanning is 16.66 ms, meanwhile one-field scanning is performed, and two-field scanning results in a sheet of the frame scanning. On the other hand, the horizontal synchronizing signal is regularly repeated in a period of 63.5 $\mu$S, and 262.5 signals are sent out during one-field and 525 signals are sent out during one-flame. The output of the integral circuit 13 relates to a vertical synchronizing signal and the equalizing pulse. The wave-shaper 15 is designed to equalize the width of the vertical pulse put out from the wave-shaper 15 with the vertical fly-back period. This vertical fly-back period is the length in which 16-horizontal synchronizing signals are contained as is generally known in that art. 263-horizontal pulses are fed to the 5-ring counter 18 during the first field scanning period, while 262-horizontal pulses are put in during the second field scanning period. Actually, however, the number of the horizontal pulses counted with the ring counter 18 is, 247 during the first field scanning and 246 during the second field scanning, since the above-mentioned vertical pulse is put in the reset terminal R. Referring now to FIG. 4 which shows the performance after the vertical pulse is out and reset is removed, when the horizontal pulse designated as A is put in the ring counter 18, the signal of logic "1" is put out from each of the output terminals $a_1$–$a_5$ for a limited time and at the proper phase condition, wherein as B designnates for instance, the 2nd horizontal pulse and the 7th horizontal pulse which are put out from the output terminal $a_2$ everytime the logic "1" signal is put out. When the second horizontal pulse is put out and the output terminal $a_2$ becomes logic "1," the gate circuit 20 opens and the clock pulse of 1.87 MHz generated from the oscillating circuit 19 is applied to the shift register 22. Since the opening period of the gate circuit 20 is 63.5 $\mu$S, 118 clock pulses are fed to the 120-shift register 22, and the video signal from the comparator 17 is set by the clock pulse. Since the effective scanning period of the horizontal scanning line is 53.5$\mu$S, the effective constituent of the video signal which is set in the shift register 22 is among the 19th and 118th. The horizontal scanning line is interlaced scanning and the second horizontal pulse after the generation of the vertical pulse which corresponds to the 3rd scanning line, therefore the video signal contained in the 3rd scanning line is memorized in the shift register 22. When the fourth horizontal pulse is put out and the output terminal $a_4$ of the ring counter 18 is converted from the logic "0" to the logic "1," the content which is memorized in the position among 19th and 118th of the shift register 22 is memorized in the memory 23. Besides, as the output of the output terminal $a_4$ is fed to the ring counter 27, the predetermined voltage generated from the longitudinal driving circuit 26 is applied to the electrode $X_1$ of the longitudinal electrode X of the matrix indicator 2. The memory 23 puts out the memory as well as the content of memory from the output terminal Q, and since the memory as well as the content of the memory is applied to the row driving circuit 25 by way of the switch circuit 24, the driving voltages which respond to the divided level by means of the comparator 17 of the video signal contained in the third scanning line are respectively applied to each of the electrodes $Y_1$-$Y_{100}$ of the row electrode pattern Y in the matrix indicator 2. Accordingly, the indication of the electrodes $Y_1$, $Y_3$, ... $Y_{99}$ or $Y_2$, $Y_4$, ... $Y_{100}$ which cross the electrode $X_1$ comply with the video signal put out from the comparator 17.

When the 5th horizontal pulse is put in the ring counter 18 and the output terminal $a_5$ becomes logic "1," it is fed to the reset terminal R of the shift register 22 by way of the inverter 21 and the shift register 22 is reset. Meanwhile, however, the video signal contained in the third scanning line is kept in the memory 23. Line C in FIG. 4 designates the operating condition of the shift register 22, while line D designates the operating condition of the memory 23. $V_3$, $V_{13}$ respectively designate the video signal contained in the third scanning line and 13th scanning line.

As described so far, since the effective 247 horizontal pulses put out during the first field scanning period, 49 pulses are put out from the output pulse $a_4$ of the ring counter 18, and then it is put in the ring counter 27 as heretofore described. Therefore the odd number electrodes $X_1$, $X_3$, ... $X_{97}$ in the longitudinal electrodes of the matrix indicator 2 are driven in turn during the first field scanning period. As understood by the above mentioned illustrations, the video signal which is memorized in the memory 23 corresponds to the 483th scanning line while the electrode $X_{97}$ is driving. The ring counters 18 and 27 are reset by the vertical pulse from the wave-shaper 15 generated between the finish of the first field scanning and the beginning of the second field scanning, and the 50-second counter of the ring counter 27 becomes the performance preparation condition. Accompanying with the beginning of the second field scanning, the video signal memorized in the memory 23 is converted whenever five-horizontal pulses are put out, alike the performance described above, and the even number of electrodes $X_2$, $X_4$, ... $X_{98}$ in the matrix indicator 2 are driven in turn by the performance of the ring counter 27. A sheet of the frame scanning is terminated by termination of the second field scanning and the TV video signal is indicated in the matrix indicator 2. The color of the picture or image indicated herein is white and black since neutral tints do not exist, however since the white vision is frequent when it is telecast, it is possible to confirm the vision. The embodiment shown in the figure is mainly aimed to see the outline and time, therefore, it sacrifices the resolution and the fidelity in vertical and horizontal. However, when the resolution and the fidelity are to be improved to some extent, the number of electrodes pattern of the longitudinal electrode X and the row electrode pattern Y in the matrix indicator 2 are increased and then the capacity of the shift register 22 and the memory 23 are increased proportionally. On the other hand the steps of the video signal may be changed from two steps "1" and "0" in white and black to three steps or more in order to shade in neutral tints.

As for the ring counter 27, the first counter works for the field scanning period in odd numbers and the second counter works for the field scanning period in even numbers. But it may be in reverse order according to some starting condition, therefore a setting circuit (not shown in the figure) which puts the required reset pulse into the reset terminal R of the ring counter 27 is settled in order to correct the reversal.

Noow, the mode of operation when the switches $S_1$, $S_2$, and $S_3$ are switched to the reverse condition of the condition shown in the figure and the manner in which the time in the time keeping device is indicated in the matrix indicator 2 will be described. Because of the release of the switch $S_1$, the switch circuit 24 is switched to the condition to feed the output of the serial transducer 32 in place of the memory 23 output. In this mode, the output of the output terminal $Q_1$ of the counter 34 is fed to the reset terminal R of the ring counter 27 by way of the switch $S_2$, and the output pulse of the variable divider 33 is fed to the clock terminal CL of the ring counter 27 by way of the switch $S_3$. As described above, the output of the counter 30 which counts the normal pulses of 1Hz from the divider 29 and the counting content whereof indicates the time is transduced into the code which fits the matrix indicator 2 by means of the code transducer 31. The content of the code transducer 31 is extracted by the pulse fed out from the variable divider 33 and then converted to the serial signal by means of the serial transducer 32. The serial signal is fed to the row driving circuit 25 in turn by way of the switch circuit 24. On the other hand, since the pulse which is the same as the sampling pulse applied to the serial transducing circuit 32 is put in the ring counter 27 in turn, the longitudinal electrodes X of the matrix indicator 2 are driven in turn synchronizing the serial signal. Alike the indicating performance of the TV video signal, the electrodes in odd numbers $X_1$, $X_3$, ... $X_{99}$ are driven in turn at the start, and then the electrodes in even numbers $X_2$, $X_4$, ... $X_{100}$ are driven in turn since the reset signal is put out from the output terminal $Q_1$ of the counter 34 against the ring counter 27. The code transducer and the serial transducer 32 develop the serial signal complying with the drive of the electrodes $X_1$-$X_{100}$ and the serial signal is applied through the switch circuit 24 to the row driving circuit 25. Corresponding with the second pulse from the output terminal $Q_1$ of the counter 34, a pulse is put out of the output terminal $Q_2$, whereby the serial signal put out from the serial transducer 32 and the drive timing of the longitudinal electrodes $X_1$-$X_{100}$ are synchronized. Thus, it is understood that the time which corresponds to the counting content of the counter 30 of the time keeping device is indicated in the matrix indicator 2. The oscillating circuit 19 and the oscillating circuit 28 are drawn independently in the figure, however, the high stable quartz oscillating circuit is usually employed in a watch. Therefore, when the oscillating circuit 28 is used in common and the oscillating frequency thereof works as an oscillating circuit 19 by dividing or multiplying, the efficiency can be improved, and the cost, the number of the parts and the power supply can be reduced. Further, when the thickness-shear crystal vibrator (AT cut quartz, tantalum-acid lithium or the like) is employed in the timepiece oscillating circuit, the frequency whereof is generally high (e.g., order in mega-Hz), and the above-mentioned efficiency is increased still more.

Though not shown in the drawing, a switch is provided for cutting off the power supply to the receiver which receives the TV video signal and the associated circuits when the time of the time keeping device is being indicated.

The detailed illustrations of the portable electronic timepiece have been given in accordance with embodiments shown in figures, and variations thereof may be made without limitation to the embodiments shown in the figures.

For example, the indicating method of the TV and time signals is not limited to that shown and a time-sharing method or the like is possible, and the matrix indicator need not be composed of liquid crystal and may comprise illuminant diodes, electro-chromic substance, PLZT, magnetic bubble domain elements or the like as well as combinations of these indicators. Besides, the time signal and TV signal are indicated separately according to the above-mentioned example, however, various modifications are possible as, it may indicate the time signal and the TV signal, in the same or different color. Thus, it may be understood that the versatility is great.

As described so far, according to the portable electronic timepiece of the present invention, the employment of the matrix indicator not only enables to indicate time as determined by a time keeping device but also to indicate the received video signal at the receiver of the television video signal. The constitution of the present invention results in the following advantages: the function of the matrix indicator may be effectively used; the correct time may be known anywhere by indication of the time telecasted by a television signal; and the time developed by the time keeping device may be corrected automatically or manually. On the other hand, the timepiece of this invention can include a watch equipped with the function of a stop watch and timepiece to indicate a time.

I claim:

1. A portable electronic timepiece comprising: electronic time-keeping means for developing electric time signals suitable for use as a time standard; receiving means for receiving a telecast video signal and developing therefrom electric video signals representative of the video information contained in the telecast video signal; indicating means receptive of the electric time signals and the electric video signals for selectively visually displaying an image of the time and of the video information; and switching means coacting with said time-keeping means and said receiving means for selectively switching the electric time and video signals to said indicating means to thereby select either the time image or the video information image to be displayed by said indicating means.

2. A portable electronic timepiece according to claim 1, wherein said indicating means comprises a matrix indicator comprised of a plurality of longitudinal electrodes and a plurality of row electrodes.

3. A portable electronic timepiece according to claim 1; wherein said electronic timepiece comprises a wristwatch.

4. A portable electronic timepiece according to claim 1; wherein said indicating means includes means for displaying either the time image or video information image on the whole display portion thereof.

5. In a portable electronic timepiece of the type having a crystal oscillating circuit for developing pulse signals suitable for use as a time standard: a matrix indicator having a plurality of longitudinal electrodes and a plurality of row electrodes for visually displaying on the whole display portion thereof an image; a receiver for receiving a telecast TV video signal and deriving therefrom an electric video signal corresponding to the information contained in the telecast TV video signal; means responsive to the electric video signal including a row driving circuit and a longitudinal driving circuit for driving said matrix indicator to indicate a video image corresponding to the information contained in the TV video signal; time-keeping means for counting the pulse signals from said oscillating circuit and deriving therefrom a time signal corresponding to time; means responsive to said time signal including said row driving circuit and said longitudinal driving circuit and further including a transducer controlled by said pulse signals for driving said matrix indicator to indicate a time image corresponding to the time signal; and switching means for selecting between the video and time images to be displayed by said matrix indicator.

* * * * *